US012623553B2

(12) United States Patent
Aspe et al.

(10) Patent No.: US 12,623,553 B2
(45) Date of Patent: May 12, 2026

(54) METHOD AND DEVICE FOR OPERATING AN ELECTRICALLY DRIVEN VEHICLE IN PREPARATION FOR A START-UP PROCESS

(71) Applicant: Bayerische Motoren Werke Aktiengesellschaft, Munich (DE)

(72) Inventors: Oiher Aspe, Munich (DE); Patrick Schaedler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 18/567,703

(22) PCT Filed: Jun. 1, 2022

(86) PCT No.: PCT/EP2022/064841
§ 371 (c)(1),
(2) Date: Dec. 6, 2023

(87) PCT Pub. No.: WO2023/274648
PCT Pub. Date: Jan. 5, 2023

(65) Prior Publication Data
US 2024/0270085 A1      Aug. 15, 2024

(30) Foreign Application Priority Data

Jun. 29, 2021      (DE) ..................... 10 2021 116 668.3

(51) Int. Cl.
B60L 15/20               (2006.01)
(52) U.S. Cl.
CPC ........... B60L 15/20 (2013.01); B60L 2240/12 (2013.01); B60L 2240/423 (2013.01); B60L 2250/26 (2013.01); B60L 2250/28 (2013.01)

(58) Field of Classification Search
None
See application file for complete search history.

(56) References Cited

U.S. PATENT DOCUMENTS

2010/0134058 A1      6/2010   Nagashima et al.
2011/0187521 A1      8/2011   Beruscha et al.
(Continued)

FOREIGN PATENT DOCUMENTS

CN              110877534 A        3/2020
DE      10 2008 040 113 A1      1/2010
(Continued)

OTHER PUBLICATIONS

Korean-language Office Action issued in Korean Application No. 10-2023-7037671 dated Mar. 10, 2025 with English translation (14 pages).

(Continued)

*Primary Examiner* — Navid Z. Mehdizadeh
*Assistant Examiner* — Jason R Roberson
(74) *Attorney, Agent, or Firm* — Crowell & Moring LLP

(57) ABSTRACT

A device for operating an electric drive machine of a vehicle in preparation for a start-up process of the vehicle is configured to determine that a preparation mode of the vehicle for preparing for the start-up process is active, and in response, operate the electric drive machine with a time-modulated target drive torque in a preparation phase for the start-up process in order to create vibrations of the vehicle by the drive machine as haptic feedback for a driver of the vehicle when the vehicle is stationary.

20 Claims, 2 Drawing Sheets

(56) References Cited

U.S. PATENT DOCUMENTS

| | | | |
|---|---|---|---|
| 2012/0095632 A1 | 4/2012 | Kimoto | |
| 2013/0131950 A1 | 5/2013 | Kim et al. | |
| 2015/0266479 A1 | 9/2015 | Blakeway et al. | |
| 2018/0022317 A1* | 1/2018 | Hakeem | B60S 1/0818 |
| | | | 701/48 |
| 2020/0079287 A1* | 3/2020 | Wolf | B60Q 9/00 |
| 2021/0003178 A1* | 1/2021 | Grethel | F16F 15/145 |
| 2021/0078577 A1* | 3/2021 | Roques | B60L 3/0061 |
| 2021/0370967 A1* | 12/2021 | Valeri | B60W 50/04 |

FOREIGN PATENT DOCUMENTS

| | | |
|---|---|---|
| DE | 10 2009 046 166 A1 | 7/2010 |
| DE | 10 2010 043 973 A1 | 5/2012 |
| DE | 10 2013 021 817 A1 | 6/2015 |
| DE | 10 2018 213 287 A1 | 2/2020 |
| DE | 10 2019 111 913 A1 | 11/2020 |
| JP | 2012-90425 A | 5/2012 |
| JP | 2013-110952 A | 6/2013 |
| JP | 2013-520351 A | 6/2013 |
| JP | 2015-534013 A | 11/2015 |
| JP | 2018-7350 A | 1/2018 |
| KR | 10-2014-0014717 A | 2/2014 |
| KR | 10-2016-0099872 A | 8/2016 |
| WO | WO 2014/048947 A1 | 4/2014 |

OTHER PUBLICATIONS

International Search Report (PCT/ISA/210) issued in PCT Application No. PCT/EP2022/064841 dated Sep. 12, 2022 with English translation (4 pages).

German-language Written Opinion (PCT/ISA/237) issued in PCT Application No. PCT/EP2022/064841 dated Sep. 12, 2022 with English translation (8 pages).

German Search Report issued in German Application No. 10 2021 116 668.3 dated Apr. 6, 2022 with partial English translation (13 pages).

Cover Page of EP 2 900 532 A1 published Aug. 5, 2015 (1 page).

Japanese-language Office Action issued in Japanese Application No. 2023-574813 dated Feb. 18, 2026, with English translation (4 pages).

* cited by examiner

METHOD AND DEVICE FOR OPERATING AN ELECTRICALLY DRIVEN VEHICLE IN PREPARATION FOR A START-UP PROCESS

BACKGROUND AND SUMMARY

The invention relates to a method and a corresponding device which make it possible to operate an electrically driven vehicle in a preparation mode for a starting process, by which in particular a shortening of the starting time of the vehicle can be brought about.

A vehicle with an internal combustion engine can be operated by the driver of the vehicle when it is stationary, for example before starting a vehicle race, in such a way that the engine has an increased drive torque, which can be used for increased acceleration of the vehicle at the moment of starting. For this purpose, the driver actuates the brake, in particular the brake pedal, of the vehicle in order to keep the vehicle at a standstill. Furthermore, the driver actuates a drive controller of the vehicle, for example the gas pedal or accelerator pedal of the vehicle, in order to bring about the effect that an increased drive torque (as compared with idling speed) is provided by the engine of the vehicle. For starting the vehicle, the driver can release the vehicle brake, so that the increased drive torque is immediately available for increased acceleration of the vehicle.

During the aforementioned preparation phase for an accelerated starting process of the vehicle, the driver of the vehicle receives haptic feedback with respect to the increased drive torque of the engine brought about by the driver by way of vibrations of the vehicle that are brought about by the engine. This haptic feedback makes it possible for the driver to set in a precise way the increased drive torque set by actuating the drive controller. This haptic feedback is also often experienced by drivers as a positive emotion and as a driving experience.

The present document is concerned with a technical object of efficiently providing a preparation phase in preparation for a starting process of an electrically driven vehicle, in particular in order to make a starting process possible with an increased drive torque and/or with enhanced driving fun for the driver of the vehicle.

The object is achieved by the present disclosure. Advantageous embodiments are also described, inter alia, in the present disclosure. It is pointed out that additional features of a patent claim dependent on an independent patent claim can form a separate invention, which is independent of the combination of all features of the independent patent claim and can be made the subject matter of an independent claim, a divisional application or a subsequent application, without the features of the independent patent claim or only in combination with a subset of the features of the independent patent claim. This applies in the same way to technical teachings which are described in the description and can form an invention that is independent of the features of the independent patent claims.

According to one aspect, a device for operating an electric drive machine of a vehicle in preparation for a starting process of the vehicle is described. The vehicle may be a battery electric vehicle (BEV). In particular, the vehicle may be designed to be driven just by one or more electric drive machines.

The device is set up to determine that the preparation mode of the vehicle in preparation for the starting process is active. The preparation mode may in this case be activated by the driver of the vehicle. In particular, the device may be set up to detect that, when the vehicle is at a standstill, the brake controller, in particular the brake pedal, for controlling one or more (friction) brakes of the vehicle and the drive controller, in particular the accelerator pedal, for controlling the drive machine are actuated simultaneously (by the driver). It can then be determined on the basis of this information that the preparation mode of the vehicle is active. It can in this way be made possible, in preparation for a starting process (while the vehicle is at a standstill), for the driver of the vehicle to actuate the brake pedal and the accelerator pedal simultaneously in order to activate the preparation mode of the vehicle.

The vehicle may comprise a user interface (for example with an operating element), which makes it possible for the driver of the vehicle to set whether or not the preparation mode of the vehicle is to be used in starting processes. For example, it can be made possible for the driver to activate a sporty mode of the vehicle, in which the use of the preparation mode in starting processes is enabled. On the other hand, if applicable, use of the preparation mode may be disabled.

The device can consequently be set up to detect that it has been set by way of the user interface (for example by way of an operating element) of the vehicle that the preparation mode is to be used in preparation for starting processes of the vehicle. It can then be determined on the basis of the setting that the preparation mode of the vehicle is active.

By enabling or blocking the preparation mode by way of the user interface of the vehicle, particularly flexible and comfortable operation of the vehicle can be made possible.

The device is also set up to operate the electric drive machine in a preparation phase for the starting process with a time-modulated target drive torque in response to it having been detected that the preparation mode of the vehicle is active. In other words, a time modulation (i.e. a change over time) of the target drive torque requested by the drive machine can be brought about in the preparation phase for the starting process (in which the vehicle is still at a standstill). The target drive torque may in this case be made up of a DC component and an AC component superposed on the DC component. In this case, at least the AC component may be changed over time. The AC component may for example be made up of one or more sinusoidal oscillations.

The device may in particular be set up to change the amplitude of the AC component over time. Consequently, an amplitude modulation of the AC component can take place. Alternatively or additionally, the device may be set up to change the frequency and/or the period duration of the AC component over time. Consequently, a frequency modulation of the AC component can take place. Alternatively or additionally, the device may be set up to vary the speed at which the amplitude of the AC component is changed over time.

The modulation of the target drive torque requested by the drive machine may in this case take place in such a way that the drive machine is made to undergo oscillations, by which vibrations of the vehicle are then brought about. In particular, the modulation of the target drive torque may take place such that, when the vehicle is at a standstill, vibrations of the vehicle are brought about by the drive machine as haptic feedback for the driver of the vehicle.

By the target drive torque requested by the drive machine, in particular by the DC component of the target drive torque, the drive shaft, in particular the rotor, of the drive machine can be set (for example preloaded) to a specific intermediate position. A (full) rotation of the drive shaft typically does not take place in this case (since the vehicle is at a standstill, and the drive shaft is blocked by the stationary wheels of the vehicle). Rather, the position of the drive shaft (in particular the rotor) of the electric drive machine can be changed over time on the basis of the modulated target drive torque to be delivered. In this case, in particular an oscillation of the drive shaft about the intermediate position can be brought about. The oscillation of the drive shaft may correspond to the AC component of the target drive torque. The intermediate position of the drive shaft may depend on the DC component of the target drive torque.

In a preparation phase for a starting process of the vehicle, a time-varying and/or oscillating target drive torque can consequently be requested by the electric drive machine of the vehicle in order to bring about vibrations (of the body) of the vehicle (corresponding to the oscillating target drive torque) as haptic feedback during the preparation phase. Thus, the driving experience for the driver of the vehicle can be improved in an efficient way. The haptic feedback can also make it possible for the driver to set in a particularly precise way the drive torque desired at the beginning of the starting process in order to make an accelerated starting process possible.

The device may be set up to determine braking information with respect to the brake torque brought about by one or more (friction) brakes of the vehicle. The braking information may indicate the value of the brake torque and/or the deflection of the brake controller, in particular the brake pedal. Alternatively or additionally, the braking information may indicate the force with which the driver actuates the brake controller.

The time-modulated target drive torque to be delivered by the drive machine may be determined and/or set in dependence on the braking information. The target drive torque may in particular be determined and/or set in such a way that the time-modulated target drive torque does not exceed the brake torque in the (entire) preparation phase. On the other hand, the target drive torque may be determined and/or set in such a way that the maximum value of the target drive torque corresponds to at least 90% of the value of the brake torque. Consequently, a greatest possible target drive torque by which it is still ensured that the vehicle is at a standstill can be requested. Strongest possible haptic feedback for the driver of the vehicle can thus be brought about (in order to enhance further the quality of the setting of the target drive torque for the starting process and/or the driving experience).

The device may be set up to determine actuating information with respect to an actuation, in particular with respect to an extent of the actuation, of the brake controller (in particular the brake pedal) for controlling the one or more brakes of the vehicle. The actuating information (also referred to in this document as braking information) may for example be sensed by a brake pedal sensor. The actuating information may indicate the brake torque requested by the driver and/or the deflection of the brake pedal.

The time-modulated target drive torque to be delivered by the drive machine, in particular the DC component of the time-modulated target drive torque, may be determined and/or set in dependence on the actuating information. In particular, the DC component of the time-modulated target drive torque may be increased as the requested brake torque increases (or be reduced as the brake torque decreases). Thus, the quality of the setting of the target drive torque for the starting process can be enhanced further. In particular, the setting range for the target drive torque that can be set by the driver can thus be increased in a flexible way.

The device may be set up to determine actuating information with respect to the actuation, in particular with respect to the extent of the actuation, of the drive controller (in particular the accelerator pedal) for controlling the drive machine. The actuating information may indicate the drive torque requested by the driver and/or the deflection of the accelerator pedal.

The time-modulated target drive torque to be delivered by the drive machine, in particular the AC component of the time-modulated target drive torque, may be determined and/or set in dependence on the actuating information with respect to the actuation of the drive controller. In particular, the time-modulated target drive torque may be adapted in such a way that the extent (for example the amplitude) of the vibrations of the vehicle brought about by the drive machine increases as the requested drive torque increases (or decreases as the requested drive torque decreases). By such an adaptation of the haptic feedback, the quality of the setting of the target drive torque for the starting process can be enhanced further.

The vehicle may comprise at least one active oscillation damper, which is designed to damp the transmission of oscillations of the drive machine to the driver's position of the vehicle (at which the driver of the vehicle is arranged). The one or more active oscillation dampers may be operated during a trip of the vehicle in order to damp the oscillations brought about by the drive machine as comprehensively as possible. Thus, a particularly comfortable trip can be made possible.

The device may be set up to deactivate the active oscillation damper in the (entire) preparation phase. Alternatively or additionally, the device may be set up to operate the active oscillation damper in the (entire) preparation phase in such a way that the transmission of oscillations of the drive machine to the driver's position of the vehicle is not damped and/or, if applicable, is even intensified.

By the deactivation and/or oscillation-intensifying operation of the one or more active oscillation dampers, the intensity of the haptic feedback can be increased further. Thus, the driving experience and/or the quality of the setting of the target drive torque for the starting process can be enhanced further.

The vehicle typically comprises a steering device, in particular a steering wheel, for steering the vehicle. The device may be set up to make a steering device actuator bring about vibrations of the steering device as (additional) haptic feedback for the driver of the vehicle in the preparation mode and/or in the preparation phase. The vibrations, in particular the amplitude of the vibrations, of the steering device may in this case be adapted in dependence on the braking information and/or in dependence on the actuating information of the drive controller. By providing additional haptic feedback, the driving experience and/or the quality of the setting of the target drive torque for the starting process can be enhanced further.

The vehicle may comprise (for all-wheel drive) a first electric drive machine for a first axle (for example the rear axle) and a second electric drive machine for a second axle (for example the rear axle) of the vehicle.

The device may be set up to operate the first drive machine with a first modulated target drive torque and to operate the second drive machine with a second modulated target drive torque in the preparation phase. Furthermore, the device may be set up to change the first and the second modulated target drive torque in relation to one another over time in such a way that the vibrations of the vehicle shift locationally over time (within the body of the vehicle). Consequently, spatial haptic feedback can be efficiently produced by the operation of the electric drive machines arranged at different points in the vehicle, in order to improve further the driving experience.

The time-modulated target drive torque, in particular the AC component of the time-modulated target drive torque, may depend on a resonant frequency of the body of the vehicle. In particular, the time-modulated target drive torque may be designed to excite vibrations of the body of the vehicle that deviate by at most 30% or by at most 20% from a resonant frequency of the body of the vehicle. Thus, haptic feedback for the driver of the vehicle can be brought about in a particularly efficient way.

The device may be set up to determine that the preparation phase has ended and/or that the starting process is beginning (and the vehicle should consequently start moving). For example, it may be detected that the driver has reduced or ended the actuation of the brake controller.

In response to this, the modulation of the target drive torque to be delivered by the electric drive machine may be ended (abruptly or smoothly over a certain time period). Furthermore, the drive machine may be operated according to the drive torque predetermined by the driver by way of the drive controller. Consequently, a direct transition into the starting process can be made possible. Thus, the comfort of a starting process can be enhanced further.

The device may also be set up to determine that the preparation mode for a specific starting process is not active, for example because the preparation mode has not been enabled by way of the user interface of the vehicle. In this case, the simultaneous actuation of the brake controller and the drive controller may have the effect that no target drive torque is requested; or no time-modulated target drive torque (for example only the DC component of the target drive torque, without the AC component) is requested by the electric drive machine.

It can consequently be brought about that no vibrations of the vehicle and no haptic feedback for the driver of the vehicle are brought about (when the preparation mode is not active).

According to a further aspect, a (road) motor vehicle (in particular a passenger car or a truck or a bus or a motorcycle) which comprises the device described in this document is described. The vehicle may be an exclusively electrically driven vehicle.

According to a further aspect, a method for operating an electric drive machine of a vehicle in preparation for a starting process of the vehicle is described. The method comprises determining that the preparation mode of the vehicle in preparation for the starting process is active. The method also comprises operating the electric drive machine in response to this in a preparation phase for the starting process with a time-modulated target drive torque in order, when at a standstill, to bring about vibrations of the vehicle by the drive machine as haptic feedback for a driver of the vehicle.

According to a further aspect, a software (SW) program is described. The SW program may be set up to be performed on a processor (for example on a control device of a vehicle), and thereby to perform the method described in this document.

According to a further aspect, a storage medium is described. The storage medium may comprise an SW program which is set up to be performed on a processor, and thereby to perform the method described in this document.

It should be noted that the methods, devices and systems described in this document can be used both alone and in combination with other methods, devices and systems described in this document. Furthermore, any aspects of the methods, devices and systems described in this document can be combined with one another in various ways. In particular, the features of the claims can be combined with one another in various ways.

The invention is described in more detail below on the basis of exemplary embodiments.

DETAILED DESCRIPTION OF THE DRAWINGS

Figure 1A:
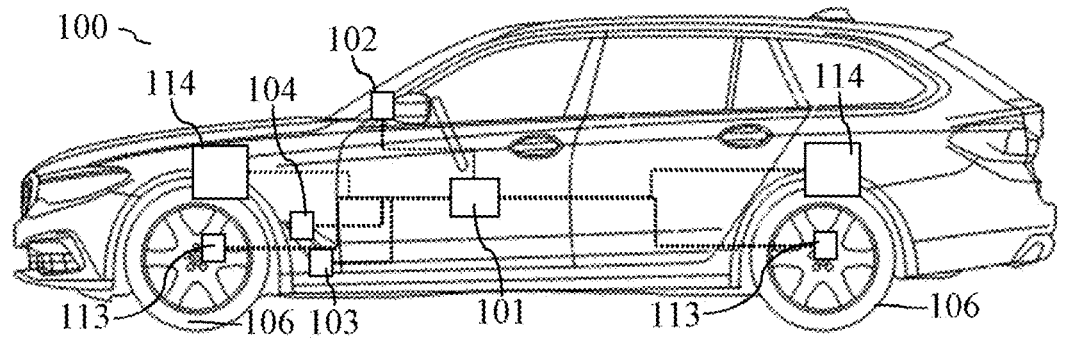
FIGS. 1a and 1b each show a vehicle, given by way of example, with electric drive machines.
Figure 1B:
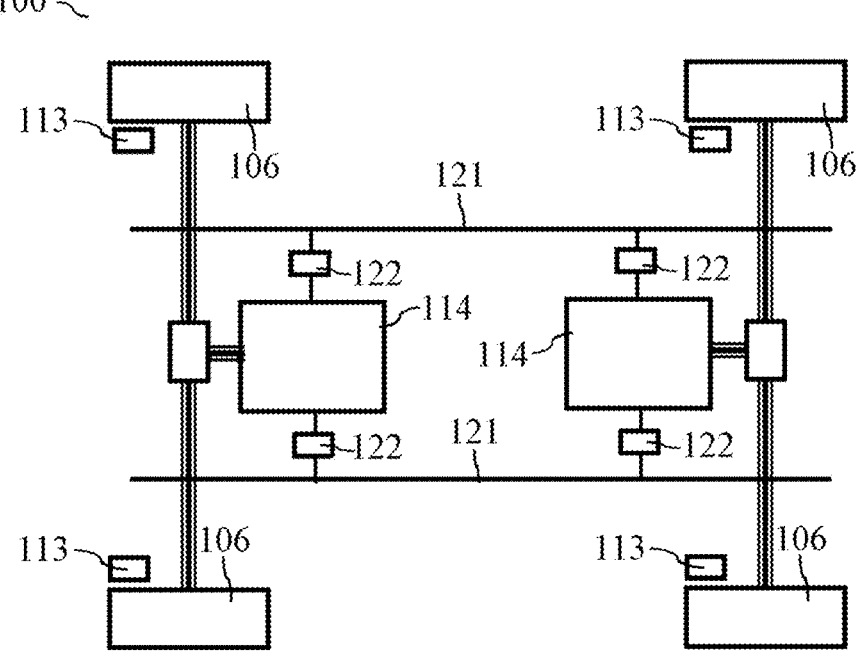

As explained at the beginning, the present document is concerned with the efficient provision of a preparation phase for a starting maneuver, by which an increased drive torque for the starting maneuver and/or an improved driving experience for the driver of the vehicle are made possible. In this connection, FIGS. 1a and 1b show different representations of an (if applicable exclusively) electrically driven vehicle 100, in particular a battery electric vehicle (BEV).

The vehicle 100 comprises at least one electric machine 114, which is operated by electrical energy from an electrical energy store (not shown) of the vehicle 100 and which is set up to drive the vehicle 100. The vehicle 100 may comprise a first electric machine 114 for a first axle (for example the rear axle) and a second electric machine 114 for a second axle (for example the front axle) of the vehicle 100, for example in order to provide an electrical all-wheel drive. The first and/or second machine 114 may each be a synchronous motor or an asynchronous motor.

The vehicle 100 also typically comprises brakes 113, in particular wheel brakes and/or friction brakes, which are set up to decelerate the vehicle 100. For this purpose, a brake 113 may act on a wheel 106 of the vehicle 100 in order to brake the wheel 106.

Furthermore, the vehicle 100 comprises a brake controller 103, for example a brake pedal, with which the one or more brakes 113 of the vehicle 100 can be actuated in order to brake the vehicle 100. In this case, the one or more brakes 113 may typically also be used to bring about the effect of keeping the vehicle 100 at a standstill even when a drive torque is acting on one or more wheels 106. In particular, the one or more brakes 113 may be used to bring about a brake torque, which can act against a drive torque of the vehicle 100. If applicable, the level of the brake torque may in this case be set by the driver by way of the brake controller 103, for example by way of a force exerted on the brake pedal and/or by way of the deflection of the brake pedal. The level of the brake torque typically increases the more strongly the driver actuates the brake pedal and/or the further the driver deflects the brake pedal.

The vehicle 100 also comprises a drive controller 103, for example an accelerator pedal or a gas pedal, with which the drive torque brought about by the one or more electric machines 114 can be set. In particular, the driver can increase the drive torque by the driver increasing the deflection of the accelerator pedal.

A (control) device 101 of the vehicle 100 may be set up to determine actuating information with respect to an actuation of the drive controller 104 and/or the brake controller 103 (for example on the basis of a respective sensor on the drive controller 104 or on the brake controller 103). Furthermore, the device 101 may be set up to determine a target drive torque on the basis of the actuating information of the drive controller 104; and/or to determine a target brake torque on the basis of the actuating information of the brake controller 103.

The device 101 may also be set up to operate the one or more electric machines 114 in dependence on the actuating information of the drive controller 104, in particular in dependence on the determined target drive torque, in particular in order to bring about the effect that the target drive torque is set by the one or more electric machines 114. In a corresponding way, the one or more brakes 103, in particular the one or more friction brakes, may be operated in dependence on the actuating information of the brake controller 103, in particular in dependence on the determined target brake torque, in particular in order to bring about the effect that the target brake torque is brought about by the one or more brakes 103.

The vehicle 100 may also comprise, as shown in FIG. 1*b*, at least one active oscillation damper 122 for reducing the vibrations brought about by the one or more electric machines 114 (in particular at the driver's position). The active oscillation damper 122 may in this case act on a mounting of an electric machine 114 on a bearer 121 of the vehicle 100.

As explained at the beginning, it may be desired by the driver of the vehicle 100, for example in preparation for starting in a vehicle race and/or for increasing the drive torque acting in a starting maneuver, to operate the vehicle 100 when at a standstill in a preparation mode in which the vehicle 100 is prepared for an imminent starting process. To prepare the vehicle 100 for the starting process, the driver 100 may simultaneously actuate the brake controller 103 in order to bring about the effect that a brake torque is brought about by the one or more brakes 113, and the vehicle 100 remains at a standstill. Furthermore, the drive controller 104 may be actuated by the driver 100 in order to bring about the effect that a drive torque is brought about by the one or more electric machines 114, but does not have the effect that the vehicle 100 starts to move on account of the brake torque acting. To initiate the actual starting process, the driver 100 may relinquish the actuation of the brake controller 103 such that the vehicle 100 is driven by the drive torque brought about by the one or more electric machines 114.

In the case of an electrically driven vehicle 100, the drive torque brought about by the one or more electric machines 114 typically does not lead to any noticeable haptic feedback for the driver of the vehicle 100, which makes it more difficult for the driver to set the desired drive torque already when at a standstill by actuating the drive controller 104.

The (control) device 101 of the vehicle 100 may be set up to operate the one or more electric machines 114 of the vehicle 100 in the preparation mode in such a way that haptic feedback is brought about at the driver's position of the vehicle 100 by the one or more electric machines 114. The haptic feedback brought about may in this case depend on the actuation, in particular on the actuating information, of the drive controller 104. In particular, the haptic feedback may be adapted in dependence on the target drive torque requested by the driver by way of the drive controller 104. Thus, it can be made possible for the driver of the vehicle

100 to prepare the vehicle 100 in a precise way for a starting process (with increased drive torque).

The (control) device 101 may be set up to modulate or vary the target drive torque requested by the one or more electric machines 114 in order to excite the one or more electric machines 114 to undergo oscillations which lead to noticeable haptic feedback at the driver's position.

The device 101 may also be set up to operate (or to deactivate) the one or more active oscillation dampers 122 for damping oscillations of the one or more electric machines 114 in order to bring about the effect that the oscillations of the one or more electric machines 114 are transmitted as well as possible to the driver's position of the vehicle 100.

The device 101 may consequently be set up to determine whether or not the vehicle 100 is to be operated in a preparation mode in preparation for a starting process. For this purpose, it may for example be checked whether the vehicle 100 is at a standstill;

whether the preparation mode has been enabled by way of a user interface 102 of the vehicle 100; and/or whether the brake controller 103 and the drive controller 104 are being actuated simultaneously.

If the aforementioned (in particular all of the aforementioned) conditions are satisfied, it can be determined that the vehicle 100 is being operated in the preparation mode. On the other hand, it can be determined, if applicable, that the vehicle 100 is not being operated in the preparation mode.

If it is determined that the vehicle 100 is not being operated in the preparation mode, it can for example be brought about by the device 101 that no drive torque and/or no haptic feedback for the driver of the vehicle 100 are brought about by the one or more electric machines 114 when the brake controller 103 is actuated (if applicable, also when the drive controller 104 is simultaneously actuated).

Figure 2:
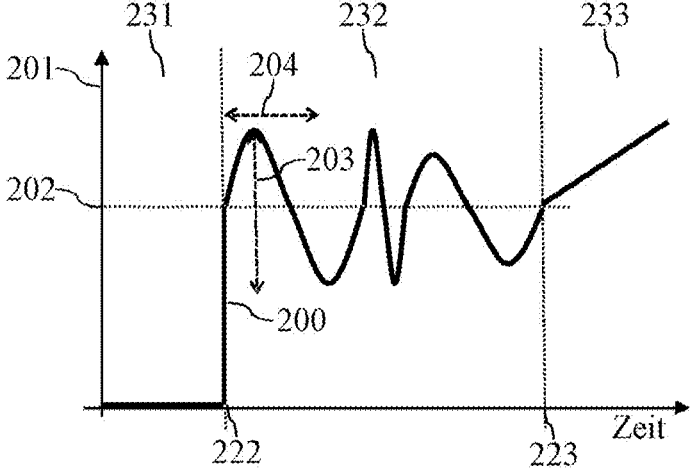
FIG. 2 shows a variation over time, given by way of example, of the target drive torque to be provided by an electric machine during a preparation phase for a starting maneuver.

On the other hand, if it is determined that the vehicle 100 is being operated in the preparation mode, the one or more electric machines 114 can be activated to provide a specific target drive torque 201 (see FIG. 2). The target drive torque 201 may in this case be made up of an average target drive torque 202 or a DC component 202 and a modulation component for the modulation of the target drive torque 201.

The average target drive torque 202 (i.e. the DC component of the target drive torque 201) may depend on the actuating information with respect to the actuation of the drive controller 104, in particular on the deflection of the drive controller 104;

the actuating information with respect to the actuation of the brake controller 103, in particular on the deflection of the brake controller 103 and/or on the force acting on the brake controller 103; and/or the brake torque brought about by the one or more brakes 103.

The average target drive torque 202 may be such that, even with a modulation about the average target drive torque 202, the effective target drive torque 201 does not exceed the brake torque. Thus, unintentional starting of the vehicle 100 can be prevented in a reliable way.

In FIG. 2, a variation 200 over time, given by way of example, of the requested target drive torque 201 is shown. At the point in time 222, it is determined that the vehicle 100 is to be operated in the preparation mode. In a first phase 231 before that point in time 222, typically no target drive torque 202 is requested by the one or more electric machines 114. As from the point in time 222, a time-modulated target drive torque 201, which oscillates and/or varies about the average target drive torque 202, is requested in a preparation phase 232. The modulation of the target drive torque 201 serves in this case for exciting oscillations of the one or more electric machines 114 that lead to haptic feedback at the driver's position of the vehicle 100.

The modulation of the requested target drive torque 201 may comprise an amplitude modulation of the amplitude 203 of the variation or the oscillation about the average target drive torque 202 (i.e. the AC component of the target drive torque 201). The amplitude 203 may in this case be changed with time. The changing of the amplitude 203 may take place continuously or step by step (for example periodically). In the example shown in FIG. 2, the third period of the requested target drive torque 201 has a smaller amplitude 203 than the first and second periods.

Alternatively or additionally, the modulation of the requested target drive torque 201 may comprise a frequency modulation, in which the period duration 204 of a period of the modulated target drive torque 201 is changed with time. The changing of the period duration 204 may take place continuously or step by step (for example periodically).

Alternatively or additionally, the frequency and/or the speed at which the amplitude 203 of the modulated target drive torque 201 is changed may be changed.

During the preparation phase 232, a modulation of the requested target drive torque 201, by which the one or more electric machines 114 (the drive shafts of which typically do not rotate) are excited to undergo oscillations, may consequently take place, the oscillations in turn leading to noticeable haptic feedback at the driver's position of the vehicle 100.

The modulation of the requested target drive torque 201 may take place in such a way that the haptic feedback brought about depends on the actuating information with respect to the actuation of the drive controller 104, in particular on the deflection of the drive controller 104, in particular in such a way that the extent of the vibrations noticeable for the driver increases as the deflection of the drive controller 104 increases. Haptic feedback brought about in such a way can make it possible for the driver of the vehicle 100 to set in a precise way the drive torque desired for the subsequent starting process. Such haptic feedback can also intensify the driving experience for the driver of the vehicle 100.

The starting process may be started by the driver in particular by the driver ending the actuation of the brake controller 103. As a consequence of this, the vehicle 100 is started with the target drive torque 201 requested by way of the drive controller 104. The modulation of the target drive torque 201 is in this case ended (abruptly or smoothly).

In the example shown in FIG. 2, the driver of the vehicle 100 initiates the starting process at the point in time 223 (for example by letting go the brake pedal). The preparation phase 232 is thereby ended, and a starting phase 233 follows. In the starting phase 233, in particular at the point in time 223, the modulation of the target drive torque 201 is ended. It is also brought about that the target drive torque 201 requested by the driver by way of the drive controller 104 is provided by the one or more electric machines 114.

During the preparation phase 232 and/or during the operation of the vehicle 100 in the preparation mode, an actuator on the steering wheel (generally on the steering device) of the vehicle 100 may be additionally activated in order to bring about vibrations on the steering wheel as part of the haptic feedback. Thus, the driving experience for the driver can be improved further.

Alternatively or additionally, the user interface 102 of the vehicle 100 may be adapted when the vehicle 100 is in the preparation mode and/or in the preparation phase 232. For example, the user interface 102 may be adapted in color in order to indicate to the driver that the vehicle 100 is in the preparation mode and/or in the preparation phase 232. Alternatively or additionally, a specific symbol may be displayed by way of the user interface 102 in order to indicate to the driver that the vehicle 100 is in the preparation mode and/or in the preparation phase 232. Thus, the comfort and driving experience for the driver can be improved further.

A description is consequently given of measures by which relatively strong vibrations of the vehicle 100 are produced during a preparation phase 232 (in particular during so-called launch control preparation) in order to improve the driving experience for the driver and/or in order to make it possible for the driver to perceive the provided drive torque already when the vehicle 100 is at a standstill. A steering-wheel vibration function may be coupled with the launch control sequence in order to intensify the haptic feedback.

During the preparation phase 232, one or more further measures for initiating the starting process may be alternatively or additionally carried out. The vehicle 100 may comprise an audio system for producing acoustic signals. The audio system may be made to produce during the preparation phase 232 acoustic signals (for example special sound effects) that further improve the driving experience for the driver of the vehicle 100. Alternatively or additionally, seat heating of the driver's seat may be selectively operated during the preparation phase 232, in particular in order to give the driver of the vehicle 100 the impression of heat being generated by the drive of the vehicle 100.

During the preparation phase 232, the drive train may be preloaded by the one or more electric machines 114 when the vehicle 100 is at a standstill such that the drivetrain of the vehicle 100 oscillates in amplitude and frequency, thereby bringing about a corresponding vibration of the vehicle 100, which is perceived by the driver of the vehicle 100 as haptic feedback.

Figure 3:
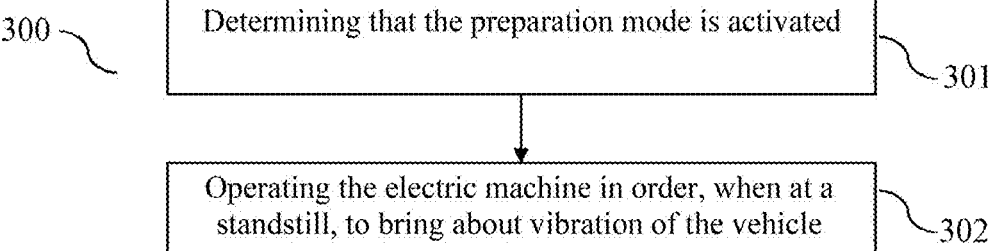
FIG. 3 shows a flow diagram of a method, given by way of example, for operating an electric machine during a preparation phase for a starting maneuver.

FIG. 3 shows a flow diagram of an (if applicable computer-implemented) method 300, given by way of example, for operating an electric drive machine 114 of a vehicle 100 in preparation for a starting process of the vehicle 100. The vehicle 100 may be a vehicle that is exclusively electrically driven. In particular, the vehicle 100 may be designed in such a way that the vehicle 100 does not have an internal combustion engine.

The method 300 comprises determining 301 that the preparation mode of the vehicle 100 in preparation for the starting process is active. To activate the preparation mode, the driver of the vehicle 100 may set that the preparation mode is to be used in preparation for a starting process, if applicable by way of the user interface 102 of the vehicle 100. When the vehicle 100 is at a standstill, the driver may also actuate the brake controller 103 (in particular the brake pedal) and the drive controller 104 (in particular the accelerator pedal) simultaneously in order to activate the preparation mode of the vehicle 100.

The method 300 also comprises operating 302 the electric drive machine 114 in a preparation phase 232 for the starting process with a time-modulated target drive torque 201 in response to it having been detected that the preparation mode is active. In other words, a target drive torque 201 can be requested by the drive machine 114, with the target drive torque 201 being time-modulated. In particular, the requested target drive torque 201 may oscillate about a DC component 202.

The modulation of the requested target drive torque 201 may in this case take place in such a way that, when the vehicle 100 is at a standstill, vibrations of the vehicle 100 (in particular vibrations at the driver's position of the vehicle 100) are brought about by the drive machine 114 as haptic feedback for the driver of the vehicle 100. Thus, the driving experience for the driver can be enhanced. It can in this way also be made possible for the driver to set in a precise way the drive torque to be delivered at the beginning of the starting process.

The present invention is not restricted to the exemplary embodiments shown. In particular, it should be noted that the description and the figures are only intended to illustrate the principle of the proposed methods, devices, and systems by way of example.

What is claimed is:

1. A device for operating an electric drive machine of a vehicle in preparation for a starting process of the vehicle, wherein the vehicle comprises a first electric drive machine for a first axle, and a second electric drive machine for a second axle of the vehicle, and wherein the device is configured to:

determine that a preparation mode of the vehicle in preparation for the starting process is active;

responsively operate the first electric drive machine in a preparation phase for the starting process with a first time-modulated target drive torque, and operate the second drive machine with a second modulated target drive torque in the preparation phase, in order to, when at a standstill, bring about vibrations of the vehicle by the drive machine as haptic feedback for a driver of the vehicle; and change the first modulated target drive torque and the second modulated target drive torque in relation to one another over time.

2. The device according to claim 1, wherein the device is configured to:

detect that, when the vehicle is at a standstill, a brake controller configured to control one or more brakes of the vehicle and a drive controller configured to control the first and second drive machines are actuated simultaneously; and determine on a basis of this detection that the preparation mode of the vehicle is active.

3. The device according to claim 2, wherein the device is configured to:

detect that a brake pedal and an accelerator pedal are actuated simultaneously.

4. The device according to claim 1, wherein the device is configured to:

detect that it has been set by way of a user interface of the vehicle that the preparation mode is to be used in preparation for starting processes of the vehicle; and determine on a basis of this detection that the preparation mode of the vehicle is active.

5. The device according to claim 1, wherein the time-modulated target drive torque comprises;

an average target drive torque component of the target drive torque; and a variation or oscillation component of the target drive torque about the average target drive torque.

6. The device according to claim 5, wherein the device is configured to:

change an amplitude of the variation or oscillation component over time;

change a frequency and/or a period duration of the variation or oscillation component over time; and/or vary a speed at which the amplitude of the variation or oscillation component is changed over time.

7. The device according to claim 1, wherein the device is configured to:

determine braking information with respect to a brake torque brought about by one or more brakes of the vehicle; and determine the time-modulated target drive torque to be delivered by the first and/or second drive machine in dependence on the braking information in such a way that the time-modulated target drive torque does not exceed the brake torque in the preparation phase.

8. The device according to claim 1, wherein the device is configured to:

determine actuating information with respect to an extent of actuation of a brake pedal configured to control one or more brakes of the vehicle, wherein the actuating information indicates a brake torque requested by the driver; and determine an average target drive torque component of the time-modulated target drive torque to be delivered by the first and/or second drive machine in dependence on the actuating information in such a way that the average target drive torque component of the time-modulated target drive torque increases as the requested brake torque increases.

9. The device according to claim 1, wherein the device is configured to:

determine actuating information with respect to an extent of actuation of an accelerator pedal for controlling the drive machine, wherein the actuating information indicates a drive torque requested by the driver; and determine a variation or oscillation component of the time-modulated target drive torque about an average target drive torque to be delivered by the first and/or second drive machine in dependence on the actuating information in such a way that an extent of the vibrations of the vehicle brought about by the first and/or second drive machine increases as the requested drive torque increases.

10. The device according to claim 1, wherein the vehicle comprises at least one active oscillation damper configured to damp a transmission of oscillations of the first and/or second drive machine to a driver's position of the vehicle, and wherein the device is configured to:

deactivate the active oscillation damper in the preparation phase; and/or operate the active oscillation damper in the preparation phase in such a way that transmission of oscillations of the first and/or second drive machine to the driver's position of the vehicle is not damped and/or is intensified.

11. The device according to claim 1, wherein the vehicle comprises a steering wheel for steering the vehicle; and wherein the device is configured to make a steering wheel actuator bring about vibrations of the steering wheel as haptic feedback for the driver of the vehicle in the preparation mode.

12. The device according to claim 1, wherein the device is configured to:

determine that the preparation phase has ended and/or the starting process is beginning; and responsively end the time-modulation of the target drive torque to be delivered by the first and/or second electric drive machine and to operate the first and/or second drive machine according to a drive torque predetermined by the driver by way of a drive controller.

13. The device according to claim 1, wherein a drive shaft of the first and/or second electric drive machine does not rotate in the preparation phase; and/or a position of the drive shaft of the first and/or second electric drive machine oscillates about an intermediate position on a basis of the modulated target drive torque to be delivered.

14. The device according to claim 1, wherein a variation or oscillation component of the time-modulated target drive torque about an average target drive torque depends on a resonant frequency of a body of the vehicle.

15. A method for operating an electric drive machine of a vehicle, wherein the vehicle comprises a first electric drive machine for a first axle, and a second electric drive machine for a second axle of the vehicle, the method comprising:

determining that a preparation mode of the vehicle in preparation for a starting process is active;

responsively operating the first electric drive machine in a preparation phase for the starting process with a first time-modulated target drive torque, and operating the second drive machine with a second modulated target drive torque in the preparation phase, in order to, when at a standstill, bring about vibrations of the vehicle by the drive machine as haptic feedback for a driver of the vehicle; and changing the first modulated target drive torque and the second modulated target drive torque in relation to one another over time.

16. The method according to claim 15, comprising:

detecting that a brake pedal configured to control one or more brakes of the vehicle and an accelerator pedal configured to control the first and/or second drive machine are actuated simultaneously; and determining on a basis of this detection that the preparation mode of the vehicle is active.

17. The method according to claim 15, comprising:

changing an amplitude of a variation or oscillation component of the target drive torque about an average target drive torque over time;

changing a frequency and/or a period duration of the variation or oscillation component over time; and/or varying a speed at which the amplitude of the variation or oscillation component is changed over time.

18. The method according to claim 15, comprising:

determining actuating information with respect to an extent of actuation of a brake pedal configured to control one or more brakes of the vehicle, wherein the actuating information indicates a brake torque requested by the driver; and determining an average target drive torque component of the time-modulated target drive torque to be delivered by the first and/or second drive machine in dependence on the actuating information in such a way that the average target drive torque component of the time-modulated target drive torque increases as the requested brake torque increases.

19. The method according to claim 15, comprising:

determining actuating information with respect to an extent of actuation of an accelerator pedal for controlling the first and/or second drive machine, wherein the actuating information indicates a drive torque requested by the driver; and determining a variation or oscillation component of the time-modulated target drive torque about an average target drive torque to be delivered by the drive machine in dependence on the actuating information in such a way that an extent of the vibrations of the vehicle brought about by the first and/or second drive machine increases as the requested drive torque increases.

20. A device for operating an electric drive machine of a vehicle in preparation for a starting process of the vehicle, wherein the vehicle comprises a first electric drive machine for a first axle, and a second electric drive machine for a second axle of the vehicle, and wherein the device is configured to:

determine that a preparation mode of the vehicle in preparation for the starting process is active;

responsively operate the first drive machine with a first modulated target drive torque in a preparation phase for the starting process, and operate the second drive machine with a second modulated target drive torque in the preparation phase, in order to, when at a standstill, bring about vibrations of the vehicle by the drive machine as haptic feedback for a driver of the vehicle; and change the first modulated target drive torque and the second modulated target drive torque in relation to one another over time in such a way that the vibrations of the vehicle shift locationally over time.

* * * * *